US006759116B2

(12) United States Patent
Edlund

(10) Patent No.: US 6,759,116 B2
(45) **Date of Patent: *Jul. 6, 2004**

(54) VOLUMETRIC EFFECT GLASS FIBER WALLCOVERINGS

(76) Inventor: Per Edlund, Tranevägen 8, 302 30, Halmstad (SE)

( * ) Notice: Subject to any disclaimer, the term of this patent is extended or adjusted under 35 U.S.C. 154(b) by 0 days.

This patent is subject to a terminal disclaimer.

(21) Appl. No.: 10/136,116

(22) Filed: May 1, 2002

(65) Prior Publication Data

US 2003/0207633 A1 Nov. 6, 2003

(51) Int. Cl.[7] .......................... D04H 3/00; D04H 5/00; D04H 13/00; B32B 17/02; B32B 27/04; B32B 27/12; B21C 47/00

(52) U.S. Cl. .............................. 428/292.1; 428/299.4; 427/178; 427/207.1; 427/269; 427/279

(58) Field of Search .......................... 428/292.1, 299.4; D25/138; 501/35; 427/269, 279, 207.1, 178

(56) References Cited

U.S. PATENT DOCUMENTS

| | | | | | |
|---|---|---|---|---|---|
| 4,006,273 | A | * | 2/1977 | Wolinski et al. | 427/278 |
| 4,044,176 | A | * | 8/1977 | Wolinski et al. | 427/256 |
| 4,495,012 | A | * | 1/1985 | Berenger | 156/78 |
| 4,902,722 | A | * | 2/1990 | Melber | 521/54 |
| 5,433,997 | A | * | 7/1995 | Land | 428/251 |
| 6,291,011 | B1 | * | 9/2001 | Edlund | 427/178 |
| 6,337,104 | B1 | * | 1/2002 | Draxo et al. | 427/207.1 |

* cited by examiner

*Primary Examiner*—Cynthia H. Kelly
*Assistant Examiner*—Camie S Thompson
(74) *Attorney, Agent, or Firm*—Robert D. Touslee

(57) ABSTRACT

A glass fiber wall covering is made by sequential application of aqueous dispersion and an image coating to selectively create an image for painted effects. The image pattern is based on a spatial expansion of second image coating upon heating during the drying process.

12 Claims, 2 Drawing Sheets

VOLUMETRIC EFFECT GLASS FIBER WALLCOVERINGS

BACKGROUND

The benefits of using fiberglass wall coverings are well known. Fiberglass wall coverings offer fire resistance, easy and uncomplicated handling and flexibility in use. They exhibit good abrasion resistance and appearance following painting. Typically, following adherence of the fiberglass wall covering to a structure, a uniform coating of a solid paint is applied, creating a textured painted wall effect.

In the past, many attempts have been made to create decorative images or color pattern of different kind on fiberglass fabrics. GB 2 249 994 A describes applying a colored pattern by a heated roller to a glass fiber fabric treated with a polyvinyl chloride, acrylic or polyester coating having a solids content of between 6 and 35% by weight of dry extracts. The outcome of the process produced a finished glass fabric with a fixed image. Typically, the hot transfer of colored pigments onto a glass fabric at a temperature of between 130° and 210° C. creates a rigid and stiff fabric, not conducive to packaging as a rolled good for later application to a wall.

It is also well known in the art to imprint the desired pattern on wall coverings by various means. EP 0 909 850 A2 describes an imprintable self-adhesive woven glass fabric and a process for applying a thin film of adhesive which may carry a decorative pattern directly on the untreated glass fiber fabric.

EP 0 875 618 describes a fiberglass nonwoven backing printed with ornamental designs by printing hard particle containing adhesives.

EP 0 445461 describes a wall covering that has a discontinuous printed adhesive coating which creates the desired pattern.

DE 198 11 152 describes an outdoor wall covering which is printed with various kinds of materials to create patterns and ornaments.

It has become increasingly desirable to conveniently obtain volumetric effects different from a standard fiberglass wall covering structure. The state of the art method to create volumetric effects on fiberglass wall covering is the use of glass fiber fabrics which are woven by Jaquard weaving machines. This technique can only provide fabrics with coarse volumetric effects without fine lines and well defined pictures. The fabrics also require a high density weaving which results in a stiff fabric that normally is hard to handle. Typically, only the most experienced or professional painter will achieve a desirable appearance.

Recently, it has become even more desirable to obtain wall coverings with distinct image effects which require three-dimensional finish structures. Such plastic effects have not been achieved when using fiber glass fabrics. It is much desired in the art to provide a feasible and economic process to produce an intermediate rolled good product, which when applied to a wall and painted by a consumer, will display a distinct and decorative image effect.

SUMMARY OF THE INVENTION

It is an object of the present invention to provide a fiberglass wall covering which is coated and conditioned such that it exhibits a volumetric image at one of the fabric surfaces, and that a subsequent application of a finishing coating or paint results in a distinct image effect. The glass fiber fabric has the same properties as standard glass fiber wall coverings, such as excellent fire resistance.

It is another object of the present invention to provide a process and a chemical formulation for the manufacture of a glass fiber fabric product so as to produce a fiberglass wall covering with designed volumetric images.

According to a preferred embodiment of the present invention, a glass fiber fabric is produced by a process comprising the steps of providing a fiberglass fabric, applying a first aqueous dispersion onto the fabric, and selectively applying to one side of the fabric a secondary image coating to a portion of the treated glass fabric, and creating the image pattern by drying the treated glass fabric.

While the preferred embodiment of the present invention utilizes fiberglass fabric in woven rolled form, other fiberglass fabrics such as a nonwoven mat may also be utilized.

Still other objects, features and attendant advantages of the present invention will become apparent to those skilled in the art upon reading the following detailed description of the preferred embodiments, together with the accompanying drawings.

DETAILED DESCRIPTION OF THE INVENTION

Figure 1:
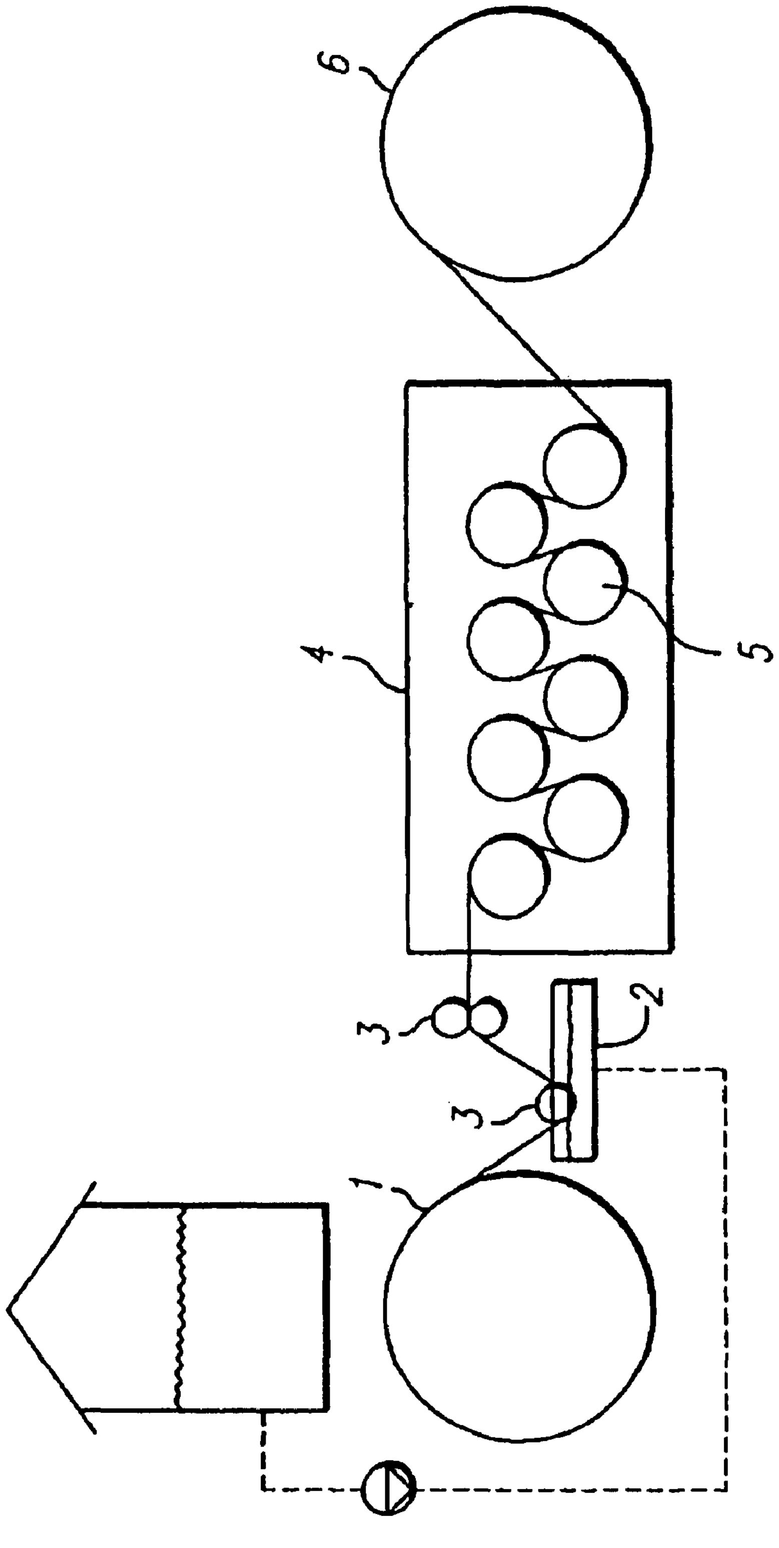
FIG. 1 depicts a preferred apparatus arrangement for applying a standard first chemical dispersion on both sides of the glass fabric.

FIG. 1 depicts a process for applying a first chemical treatment to a glass fabric. Preferably the glass fabric is a woven product formed from fiber glass yarn. The weave is typically a simple pattern, of up to eight shafts. The fabric can be produced, for example, on Dornier weaving machines, Rapiers or Air-Jets, in typically two or three meter widths. The fabric can be provided in roll form having a length of approximately 1,500–6,000 meters. Many fiber glass yarns may be selected for use when producing the woven materials for use in the present invention. Preferred yarns include, for the warp direction continuous C-glass or E-glass of 9–10 microns, 139–142 tex with approximately 315–340 ends per meter. An alternative warp yarn is continuous C-glass or E-glass of 6–9 micron, 34–68 tex with 680 ends per meter. For the weft direction, a preferred glass is discontinuous spun E-glass or C-glass, 8–11 micron, 165–550 tex with about 170–600 ends per meter. An alternative weft yarn includes continuous volumized or bulked E-glass or C-glass of 8–11 micron, 165–550 tex with about 170–600 ends per meter.

The present invention is also applicable to nonwoven glass fabrics, such as mat products. These can be produced, for example, by conventional wet-laid processes such as those described in U.S. Pat. Nos. 4,112,174; 4,681,802 and 4,810,576, the disclosures of which are incorporated herein by reference.

In the process of the present invention, the glass fabric 1, preferably provided in roll form, is fed to the first impregnation bath 2, typically with the aid of through rollers 3 and conventional conveyance means to contact on both surfaces a bath of the chemical dispersion. Alternatively, for example, a transfer or pick up roll may convey the chemical mixture to at least one of the glass fabric surfaces.

A preferred first aqueous chemical dispersion includes the components identified in Table 1 below where concentrations are provided on a weight basis.

TABLE 1

| | |
|---|---|
| Starch binder | 10 to 70% of dry substance |
| Polymeric latex binder | 20 to 80% of dry substance |
| Cross-linker | 0 to 15% of dry substance |

Alternatively to the use of rollers 3, rotary screens may be used to apply the chemicals to the glass fabric 1. The chemical mixture is supplied to the interior of the two rotating screens and applied to the glass fabric by contact with the rotating screens.

Commercially available starch binder or CMCs (carboxymethyl cellulose) can be used. Starch binder derived from potatoes are preferred, but also corn can be used as a starch source. The polymeric latex binders are preferably copolymers of vinyl acetate and acrylics, e.g. ethylvinyl acetate and styrene acrylics. However, polyvinyl acetate (PVAc) or other polymeric latex binders can also be used.

Cross-linkers are agents that are reactive with certain functional groups located primarily on the polymeric latex. Cross-linkers preferably are used in a concentration of 3 to 12 percent on a dry basis to improve important characteristics such as film formation, hydrophobicity, wet strength etc. These reactive agents can be either organic or inorganic types, e.g. based on zirconium, urea/formaldehyde or glyoxal derivatives. Zirconium cross-linking agents (e.g. ammonium-zirconium-carbonate) are preferred. The preferred formulation is the most cost effective and technically functional.

The mixture of table 1 is preferably water based, and has a dry substance percentage of between 5 and 20 weight percent, preferably between 10 and 12 weight percent in the first chemical bath. Besides white pigments such as titanium dioxide, coloured pigments can also be added or used to create coloured fabrics as well.

Following the impregnation, the fabric may be conveyed to a drying oven 4, which in the preferred embodiment of FIG. 1 utilizes steam heated cylinders 5. After drying, the fabric can be cut into desired width, and collected for the secondary treatment described hereafter. A fabric length of approximately 1,000 and 6,000 meters of treated fabric can be collected at batching stand 6. Alternatively, the subsequent application step wherein the second coating is applied can be carried out on a continuous basis.

This first impregnation step adds additional volume and opacity to the fabric. Typically 10–60 g/m$^2$ of the coating are applied to the wall covering.

Figure 2:
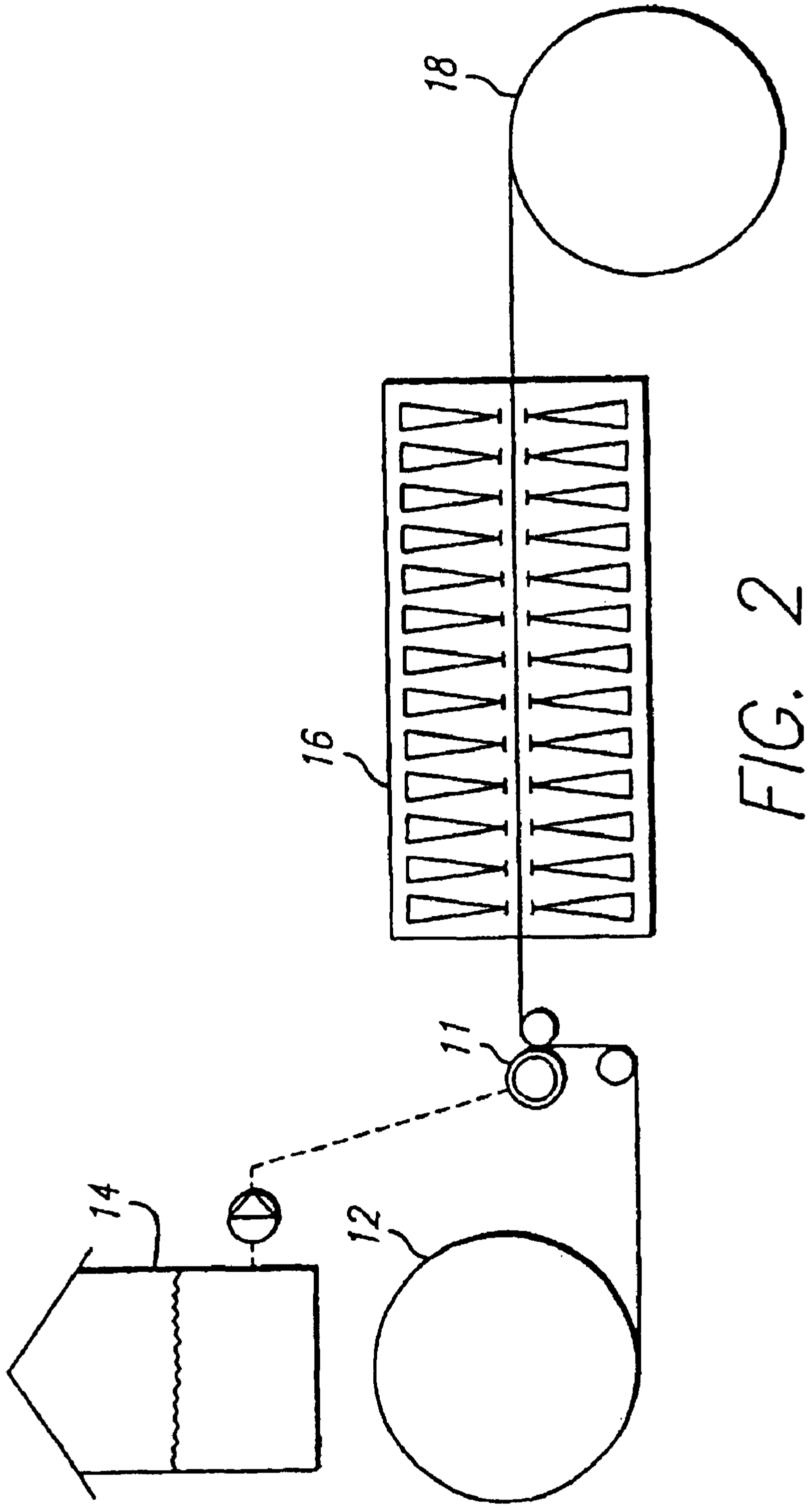
FIG. 2 depicts the process for applying the second chemical dispersion to one side of the glass fabric in a preferred application technique using a rotating screen.

In FIG. 2, a preferred method of applying the image coating is shown. Such application to one side only is on top of the previously dried first coating. A rotating screen 11, such as available from Stork, may be used to selectively apply a secondary image coating to a select portion of the treated glass fabric 12. The rotating screen is preferably laser drilled with a desired image pattern, and the chemicals of the second chemical mixture are supplied to the interior of the rotating screen. The chemical mixture 14 of the second coating are selectively applied to the glass fabric by contact with the rotating screen.

The image coating contains chemicals or chemical mixtures which expand or chemically react upon the application of heat. Such chemicals, like foaming agents or expandable microspheres are well known and commercially available over many years. Finely dispersed materials which expand upon heating can be used. In particular expandable thermoplastic microspheres are well suited for the image coating. Such microspheres are commercially available (e.g. Expancel®, CASCO Nobel). They consist of polymer shell encapsulating blowing agents which are gasified upon heating. Examples for usable polymers of the microspheres are acrylic esters, methacrylic esters, vinylchloride, vinylidene chloride, styrene or butadiene or mixtures thereof.

The blowing agents or propellants are for example CFCs or hydrocarbons, such as n-pentane, isopentane, isobutane, butane or other blowing agents, which are conventionally used in those microspheres.

The particle size of the unexpanded spheres is in the range of 1 μm–1 mm, preferably 2–500 μm, more preferably 5–50 μm.

When heated, the thermoplastic shell softens resulting in a dramatic increase of the volume of the microspheres. When fully expanded or blown up, the volume of the microspheres increases more than 40 times corresponding to an increase of the microspheres by a factor 2–5. Such microspheres are mostly used as fillers in polymers and paints.

A preferred aqueous chemical mixture useful in the secondary image coating of the present invention consists of those components set out in Table 2 below. The concentration of said substances of table 2 in water is about 10–50%, preferably 20–40% by weight.

Preferably 0.5–50 g/m$^2$, and more preferred 5–40 g/m$^2$ of the image coating are applied to the glass fabric.

TABLE 2

| | |
|---|---|
| Polymeric latex binder | 20 to 80% of dry substance |
| Expandable Chemicals | 5 to 40% of dry substance |
| Polypropylene glycole | 5 to 50% of dry substance |
| Rheology modifier | 0 to 20% of dry substance |

The polymeric latex binders are preferably copolymers of vinyl acetate and acrylics, e.g. ethylvinyl acetate and styrene acrylics. However, polyvinyl acetate (PVAc) or other polymeric latex binders can also be used.

The secondary image coating may also contain pigments for image colouring. All kind of pigments which are suitable for the process can be used. Rheology modifiers (Thickener) may be also added to the image coating to improve the processability. Rheology modifiers may be selected from the known group of acrylic thickener, polyurethane thickener or cellulose thickener, etc. In addition, small amounts of de-foaming materials based on oil or silica can also be added to the chemical mixture to improve the efficiency of the printing process.

Alternatively to the rotating screen employed in the preferred embodiment, the image coating may be applied by a flat screen method, or any other method to selectively place the chemicals on the treated glass fibre surface.

Following the application of the dispersion to the fabric surface, the glass fabric, now possessing an image coating, must be conveyed to a drying means which in the preferred embodiment of FIG. 2 is depicted as air dryers 16. During the heat treatment the expandable chemicals of the image coating react and cause the coating to expand. Induced by the chemical reaction and the expansion of the coating, a well distinguishable volumetric pattern can be created.

The form of these expanded or blown up spheres is typically spherical to oval in the cross section through the spheres ("regular form") and therefore different from those cavities of known foamed polymer structures which have an irregular form in the cross section through the foam. "Irregular" means any possible form of a foamed cavity.

The drying process also stabilizes the coating and the created image pattern. After drying, the fabric can be cut into desired widths and lengths, and collected into rolls at batching stand 18.

The drying temperatures and drying times which are needed to fully establish the images depends on the used image coating materials and the mixture compositions. With the preferred composition of Table 2, the fabric must be dried at 140° C. for approximately 240 seconds.

The product of the novel process described above is typically supplied to an end user in roll form, for application to a wall or other interior structure. Conventional types of glues can be used to apply the treated glass fabric to a wall or other interior structures. The product of the present invention possesses the same benefits and favourable properties as untreated standard glass fibre wall covering, with the added benefit of a volumetric image effect in a user selected colour, combined with a less labour intensive process. The image effect glass wall covering of the present invention results in a higher quality and in a more consistent appearance if compared to other painting methods, in particular when used in small spaces and interior corners.

The foregoing description of the specific preferred embodiments will fully reveal the general nature of the present invention that others can readily modify or adapt for various applications to such specific embodiments, without departing from the novel generic concept, and therefore such adaptations and modifications would and are intended to be within the scope of equivalents of the disclosed embodiments. The phraseology and terms employed herein are for the purpose of enablement and description and do not limit the scope of the claims.

EXAMPLE

All percent-ratios refer to weight percent. A glass woven fabric consisting of 139 tex texturized warp yarns with 315 yarns per meter and 250 tex texturized glass staple fiber yarns with 200 yarns per meter is produced and impregnated on both sides with a 12% aqueous mixture of 25% potato starch and 47% acrylic latex binder together with 6% zirconium cross-linker (ammonium-zirconium-carbonate) and 22% white based pigment.

After drying a 30% aqueous dispersion is applied by using rotary screens to create an image at the fabric surface. The formulation contains, based on dry substance, 70% polymeric binder, 15% microspheres-composition (Expancel®) and 15% propylene glycole. After heating and drying in an air dryer oven the image develops.

What is claimed is:

1. A glass fibre wall covering with a volumetric image pattern comprising a glass fibre fabric impregnated and coating on both sides with a first dried coating comprising a starch and a polymeric latex binder, and having selectively applied to a portion of one surface of the glass fabric a second dried coating, whereby the second dried coating comprises a polymeric binder and expanded microspheres and exhibits a volumetric image pattern.

2. A wall covering according to claim 1, wherein said glass fibre fabric is a woven or a non woven fabric.

3. A wall covering according to claim 1, wherein the said starch of the first dried coating is potato starch.

4. A wall covering according to claim 1, wherein the said polymeric latex binder component of the first dried coating is an acrylic latex binder.

5. A wall covering according to claim 1, wherein the said first dried coating includes a cross-linking agent.

6. A wall covering according to claim 1, wherein the said first dried coating is applied as an aqueous dispersion in a continuous process.

7. A wall covering according to claim 1, wherein said polymeric binder of the second coating is an acrylic latex binder.

8. A wall covering according to claim 1, wherein said expanded microspheres of the second coating are thermoplastic microspheres.

9. A wall covering according to claim 1, wherein said second coating also contains rheology modifier and de-foaming agents.

10. A wall covering according to claim 1, wherein said second coating also includes pigments.

11. A wall covering according to claim 5, wherein the cross-linking agent comprises a zirconium-based compound.

12. A glass fibre wall covering comprising a glass fibre fabric, at least one first coating on both sides of said glass fibre fabric, wherein said first coating comprises a starch and a polymeric binder, and a second coating with a volumetric structure on said first coating in predetermined areas thereof, said volumetric structure comprising a plurality of regular formed cavities.

* * * * *